Jan. 5, 1954
M. A. KNIGHT
2,665,326
VENT PLUG AND ELECTROLYTE LEVELING DEVICE
FOR AIRCRAFT STORAGE BATTERIES
Filed July 8, 1952
2 Sheets-Sheet 1
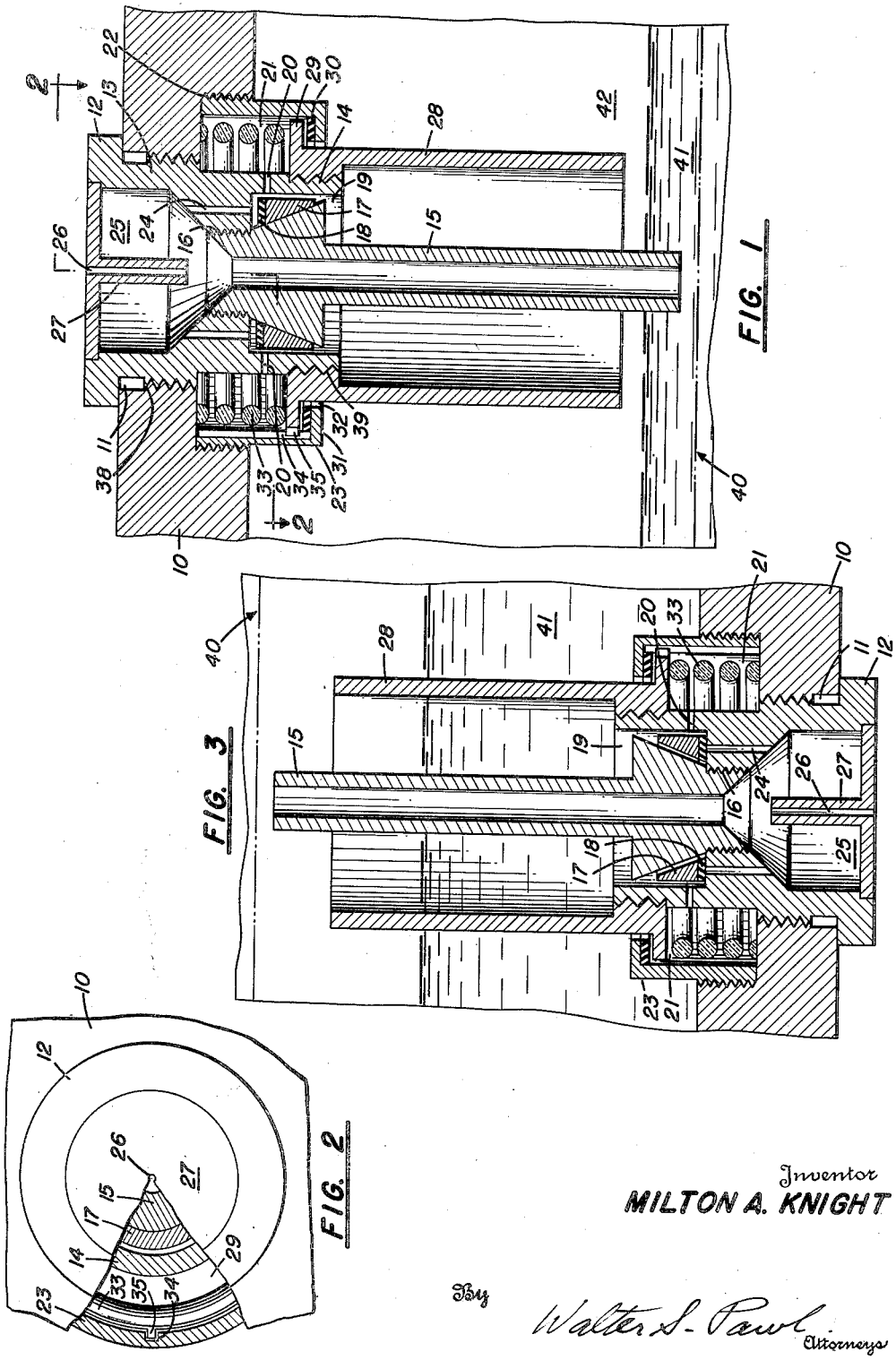
Inventor
MILTON A. KNIGHT
By Walter S. Paul
Attorneys Jan. 5, 1954
M. A. KNIGHT
2,665,326
VENT PLUG AND ELECTROLYTE LEVELING DEVICE
FOR AIRCRAFT STORAGE BATTERIES
Filed July 8, 1952
2 Sheets-Sheet 2
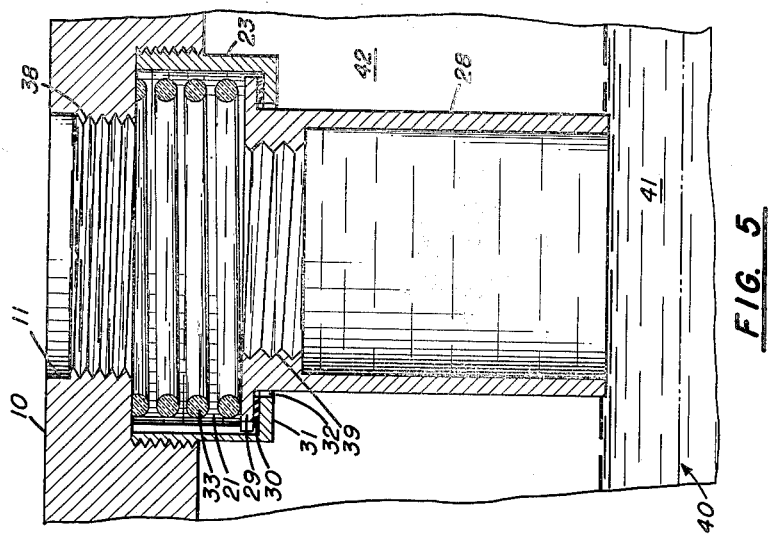
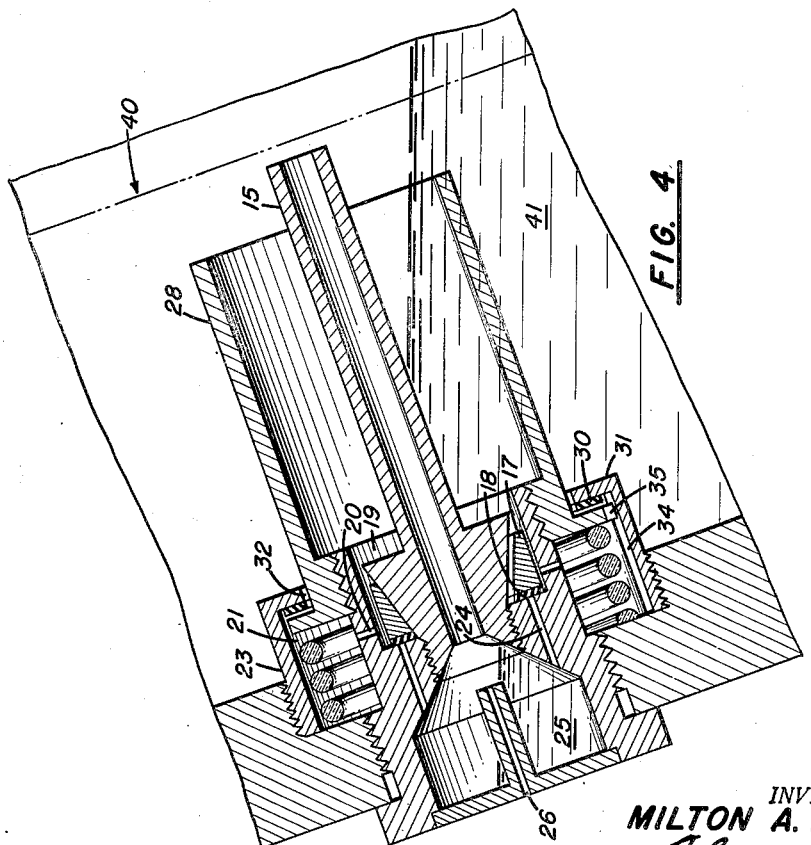
INVENTOR.
MILTON A. KNIGHT
BY
ATTORNEYS Patented Jan. 5, 1954

2,665,326

UNITED STATES PATENT OFFICE 2,665,326

VENT PLUG AND ELECTROLYTE LEVELING DEVICE FOR AIRCRAFT STORAGE BATTERIES

Milton A. Knight, Clifton, Va.

Application July 8, 1952, Serial No. 297,793

7 Claims. (Cl. 136—178)

(Granted under Title 35, U. S. Code (1952), sec. 266)

The present invention relates to a vent plug and electrolyte leveling device for storage batteries for aircraft or other uses where the battery is likely to be inverted for an appreciable length of time.

Storage batteries of the lead and acid type require continuous venting to the atmosphere and when inverted require some means of venting the gases formed without the loss of electrolyte.

The strong acids of the electrolytic fluid are corrosive and dangerous to equipment and, when lost, cause the battery to be damaged or destroyed.

The present invention has for its principal object to provide for a vent plug which permits the venting of gases when the battery is either in normal position or inverted.

Another object of the invention is to provide for a vent plug which prevents the loss of electrolyte when the battery is inverted or tipped from its normal position.

A still further object is to provide a vent plug which prevents over-filling when water or electrolyte is being added to the battery.

The exact nature of this invention as well as other objects and advantages thereof will be readily apparent from consideration of the following specification relating to the annexed drawing in which:

Fig. 1 is a view in cross-section of the vent plug with the battery in vertical position.

Fig. 2 is a fragmentary top view partially in section taken on line 2—2 of Fig. 1.

Fig. 3 is a view in a section with the battery inverted.

Fig. 4 is a view in section with the battery tilted, and

Fig. 5 is a view with the vent plug removed in condition for re-filling the battery.

Referring to the drawing in which like numerals indicate like parts throughout the several views, battery case 10 has threaded filler and vent plug opening 11 with plug 12 composed of upper portion 13 and lower portion 14 and vent tube 15 threadably connected at 16. Vent tube 15 is seen to have a conical upper and upon which rests valve 17 having gasket 18 when the battery is in an upright position.

An annular chamber 19 is formed between the valve 17 and the inner wall of the lower portion 14 of plug 12 and is connected by passages 20 to chamber 21 formed by a recess 22 in case 10 and a ring 23 threadably secured therein. Other passages 24 connect chamber 19 with a liquid trap 25 formed in the plug 12 which is open to atmosphere through passage 26 in the nipple 27.

The lower portion 14 of plug 12 has a downwardly extending tube 28 removably threaded thereon, the shoulder 29 of which cooperates with the seal 30 on flange 31 of ring 23 to block passage 32 when pressed by spring 33, as shown in Fig. 5. Ring 23 has a groove in one side of its inner wall and the shoulder 29 or tube 28 has lug 35 slidable in this groove, preventing undesired rotation of tube 28, the ring 23 being cemented or otherwise secured to case 10 in any conventional manner.

Portions 13 and 14 of the plug 12 have differently pitched threads 38 and 39, respectively, the thread of the lower portion 14 having a greater pitch, here shown in exaggerated view.

In operation, when the battery is in upright position as shown in Fig. 1, gases produced by the operation of the battery are vented to atmosphere by passage 32, chamber 21, chamber 19, passages 24, and passage 26. Should the battery be inverted as in Fig. 3 or tipped to a less than horizontal position as in Fig. 4, the valve 17 and seal 18 close passages 24 and the electrolyte 41 which may escape down the vent tube 15 is caught in the trap 25, later to be returned as the battery is made upright. While in inverted position, gas is vented to atmosphere directly through the vent tube 15 and the passage 26, it being understood that the battery electrolyte does not completely fill the cell but leaves a space for gas or air above the cell as in conventional batteries.

The optimum performance of the portion of the invention thus described is dependent upon the amount of electrolyte in the battery with regard to the dimensions of the battery cell space and the means for keeping the electrolyte at the proper level is seen in Fig. 5. Due to the threads 39 of the tube 28 having a greater pitch, as the plug 12 is unscrewed, the tube 28 is disconnected from the lower portion 14 of plug 12, allowing the spring 33 to press the shoulder 29 and seal 30 on the ring 23, closing passage 32. This seals the space 42 above the electrolyte 41 in the top of the cell and as electrolyte or water is poured in through tube 28 it reaches the level of the lower end of the tube 28 and then fills tube 28. When the plug 12 is screwed into the opening 11, it lifts tube 28 to the position shown in Fig. 1, opening passage 32 and allowing the fluid in tube 28 to sink into the cell. The dimensions of the tube 28, liquid trap 25, vent tube 15 with respect to the cell are to be such that little fluid normally will enter the liquid trap as in Fig. 4, allowing for the normal expansion and evaporation of the fluid and for the proper covering of the cell's plates the top edges of which are in the vicinity of line 40.

It will be therefore seen that the invention prevents overfilling of the battery and prevents the dangerous spilling of the electrolyte in any position, allowing normal operation of the battery in aircraft during all attitudes of flight and maneuvers.

It should be understood, of course, that the foregoing disclosure relates to only a preferred embodiment of the invention and that numerous modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

I claim:

1. A closure for a container having a normal operating liquid level therein comprising a plug adapted to be removably secured in an opening in the top of the container, a chamber in said plug opening to atmosphere, a passage in said plug normally venting the space above the liquid level in said container to said chamber, a vent pipe secured to said plug connecting said chamber to the space above the liquid level of the container in inverted position, and a gravity actuated valve reciprocal in said container operable to close said passage upon inversion of the container.

2. The device as set forth in claim 1 and a single liquid trap in said closure and positioned in said chamber constructed and arranged to trap and return to the container liquid spilling into said vent pipe upon inversion of the container.

3. In a container having a normal operating liquid level therein, a filler cap and valve device comprising a closure removably secured in an opening in the top of the container, said closure having a chamber vented to atmosphere, a vent pipe secured to said closure connecting said chamber with the space above the liquid level of the container while in inverted condition, a fluid conduit in said container surrounding said opening and extending below the normal operating liquid level, said conduit having a port near the top thereof connecting the space in said container exterior of said conduit to the space within said conduit, means in said closure defining a passage connecting said first-named space with said chamber, a first valve means reciprocal in said container operable to close said passage upon inversion of said container, a second valve means in said container biased to close said port in said fluid conduit, and means on said closure adapted to open said second valve means upon seating of said closure in said opening.

4. The device as set forth in claim 3 in which said fluid conduit comprises a first tube portion fixed to the top of said container and therewithin, and a second tube portion telescopically arranged within said first tube portion and slidable therein, said first and second tube portions having an inwardly facing and an outwardly facing shoulder respectively coacting to form a closable passage constituting said port in said conduit.

5. The device as set forth in claim 3 in which said first valve means comprises an annular weighted ring slidable on said vent pipe constructed and arranged to close said passage defining means in said closure upon inversion of said container.

6. The device as set forth in claim 4 in which said second valve means comprises a compressible seal between said inwardly and said outwardly facing shoulders on said first and second tube portions and a compression spring in said container biased to press said shoulders together on said seal.

7. The device as set forth in claim 6 in which said means adapted to open said second valve means comprises two threaded portions on said closure constructed and arranged to coact one each with matching threads in the opening in the top of the container and with matching threads on the second tube portion, said threaded portions having dissimilarly pitched threads whereby upon seating of said closure in said opening said second tube portion is lifted against the compression of said spring.

MILTON A. KNIGHT.

References Cited in the file of this patent

UNITED STATES PATENTS

| Number | Name | Date |
|---|---|---|
| 1,977,506 | Dodds | Oct. 16, 1934 |

FOREIGN PATENTS

| Number | Country | Date |
|---|---|---|
| 336,041 | Great Britain | Oct. 9, 1930 |